(12) United States Patent
Barnes

(10) Patent No.: US 8,270,640 B1
(45) Date of Patent: Sep. 18, 2012

(54) SOUND SYSTEM FOR A SPORTS BIKE

(76) Inventor: Richie D. Barnes, Columbia, SC (US)

( * ) Notice: Subject to any disclaimer, the term of this patent is extended or adjusted under 35 U.S.C. 154(b) by 115 days.

(21) Appl. No.: 12/819,837

(22) Filed: Jun. 21, 2010

Related U.S. Application Data

(63) Continuation of application No. 10/759,779, filed on Jan. 19, 2004, now abandoned, which is a continuation of application No. 09/721,184, filed on Nov. 21, 2000, now abandoned.

(51) Int. Cl.
H04R 5/02 (2006.01)
(52) U.S. Cl. .......... 381/302; 381/86; 381/389; 224/423; 224/427; 224/428; 224/413; 180/219
(58) Field of Classification Search .................. 381/86, 381/302, 389; 224/585, 401, 423, 427, 428, 224/413; 180/219
See application file for complete search history.

(56) References Cited

U.S. PATENT DOCUMENTS

| 4,485,884 | A | * | 12/1984 | Fukunaga et al. | 180/219 |
| 4,981,243 | A | * | 1/1991 | Rogowski | 224/431 |
| 5,744,027 | A | * | 4/1998 | Connell et al. | 210/96.2 |
| 6,178,101 | B1 | * | 1/2001 | Shires | 363/39 |
| 6,354,476 | B1 | * | 3/2002 | Alderman | 224/413 |
| 7,040,770 | B1 | * | 5/2006 | Olijnyk et al. | 359/841 |
| 7,040,771 | B2 | * | 5/2006 | McGuinness | 359/842 |

* cited by examiner

Primary Examiner — Disler Paul
(74) Attorney, Agent, or Firm — Michael A. Mann; Nexsen Pruet, LLC

(57) ABSTRACT

The present invention is a sports bike-type motorcycle with a sound system deployed in major part discretely in the cowling behind the rider. The speakers are incorporated into existing features in the front of the bike, such as in the rearview mirrors. To compensate for the smaller battery of sportbikes but still deliver peak power for dynamic sound, a capacitor in electrical connection with the battery and amplifier provide effective audio response. The sound system, being incorporated into existing structural features in the sports bike, cannot be observed by passers-by and is therefore less vulnerable to theft or vandalism. Also, the profile and aerodynamics, and therefore performance characteristics of the sportsbike, are not changed or compromised by the integration of the sound system within the existing structural features of a sportsbike. Furthermore, the sound system if incorporated into the cowling structure, can be packaged as an aftermarket option and mounted on a sportsbike without significant modification, since the cowling used to contain the system is preferably selected from commercially-available options from the manufacturer.

6 Claims, 4 Drawing Sheets

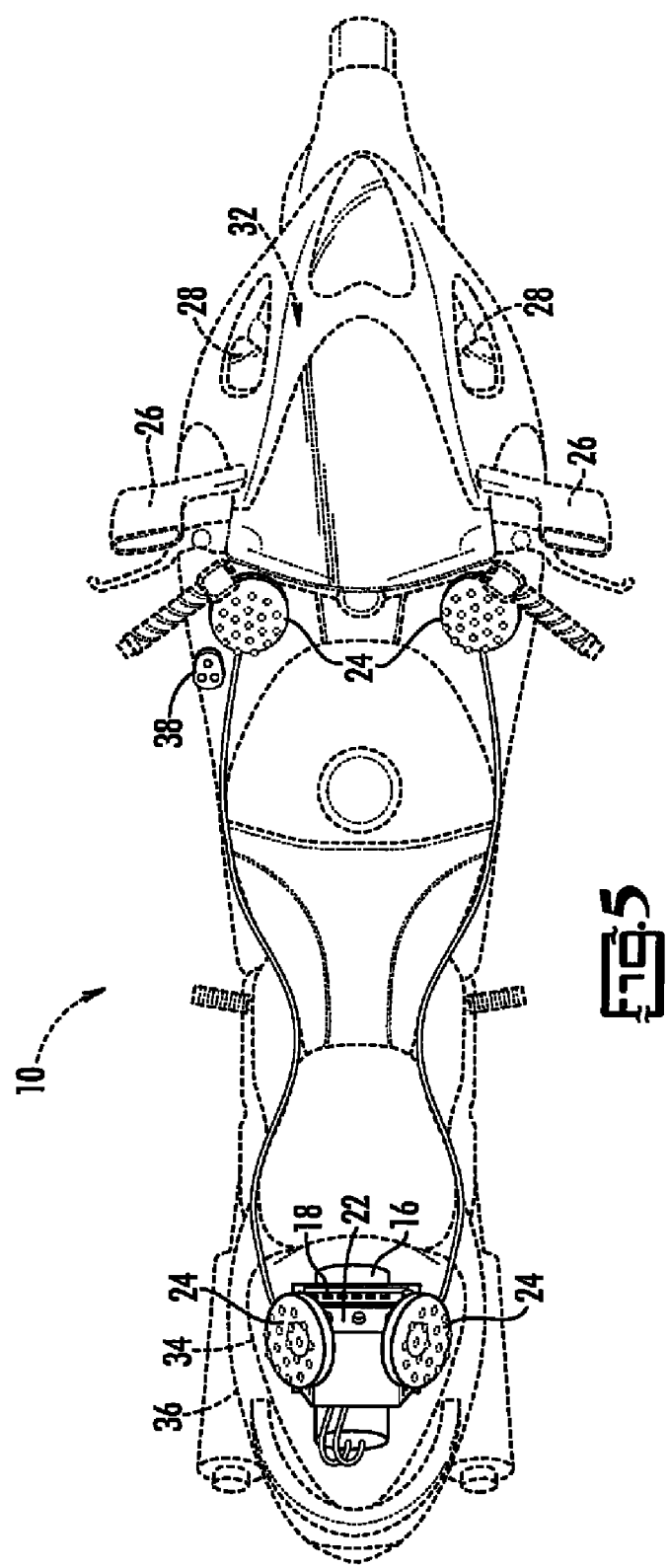

SOUND SYSTEM FOR A SPORTS BIKE

CROSS REFERENCE TO RELATED APPLICATIONS

This application is a continuation of U.S. non-provisional patent application Ser. No. 10/759,779, filed Jan. 19, 2004, now abandoned which is a continuation of U.S. application Ser. No. 09/721,184 filed Nov. 21, 2000 now abandoned.

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM LISTING COMPACT DISK APPENDIX

Not Applicable.

BACKGROUND OF THE INVENTION

Generally, the present invention relates to sports bikes with sound systems. In particular, the present invention relates to a type of motorcycle widely referred to as a sports bike with a sound system having audio components and external speakers adapted to the specific requirements of the aerodynamic design and electrical system of a sportsbike-type motorcycle.

For many years, there existed no audio components that were designed specifically for motorcycles. The only music options available for motorcycle riders were either to wear headphones coupled with a portable personal radio-receiver or to somehow carry or attach to the motorcycle a small radio with a loudspeaker. Neither of these options yielded satisfactory results; riders wearing headphones had impaired perception of traffic conditions, and riders using small radios with loudspeakers were dissatisfied with sound quality and volume.

Consequently, in order to meet riders' needs, there have been modest developments in the field of motorcycle sound systems. For example, helmet-mounted speaker systems have been invented to take the place of headphones. U.S. Pat. Nos. 4,524,461; 5,119,505; 5,243,659; and 6,075,857 disclose motorcycle helmets that contain integrated speakers suitable for listening to music as an element of the invention. Unfortunately, these improvements cannot meet the needs of multiple listeners or the needs of riders who are not wearing helmets.

Further, handlebar- or gas-tank-mounted devices have enabled riders to more easily carry their radios and loudspeakers. U.S. Pat. Nos. 4,436,350; 4,754,901; 4,756,454; 4,856,364; 4,974,759; 4,981,243; 5,001,779; and 5,771,305 disclose assemblies that allow small radios with loudspeakers to be carried on bicycles, scooters, or motorcycles. However, the sound quality and volume are generally unsatisfactory. In several of these inventions, the device either obscures the speedometer and other gauges, or covers the gas-tank opening, making refueling more difficult. Further, these devices are plainly visible when mounted, and thus vulnerable to theft or vandalism.

Also, there have been developments in speaker technology, allowing riders to include speakers into the existing body of the motorcycle. U.S. Pat. Nos. 4,445,228; 4,600,208; and 4,768,870 disclose systems for integrating speakers inside the rearview-mirrors of a motorcycle and for distributing speakers on a motorcycle to enhance sound quality and availability. While these inventions are important developments toward better motorcycle sound systems, they do not provide a fully-integrated system that avoids all of the aforementioned difficulties.

In addition, custom manufacturing companies have been able to develop sound systems for motorcycles having significant available storage space. For example, on motorcycles with "saddlebags," stereo systems have been mounted inside this available space, and speakers have been mounted on the handlebars. While this option seems to solve most of the difficulties experienced by motorcycle riders desiring a sound system, motorcycles that lack substantial storage space are, disappointingly, excluded from enjoying this option.

Currently, only riders of large, cruiser-type motorcycles that have electrical systems capable of supporting audio components can enjoy a sound system. Unfortunately, the very popular, smaller, sleeker sportsbike-type motorcycle cannot support such a system, due to limited available space and limited electrical output and different philosophy. Presently, a sportsbike rider's only recourse is the use of audio components that are mounted on the exterior of the sportsbike subsequent to manufacture. The most popular alternative available for sportsbike riders is an aftermarket commercially-available strap-on tank bag that carries portable audio components, manufactured by E & E Products under the trademark TANKTUNES. However, just as in the aforementioned inventions, this alternative has several disadvantages. First, the bag covers the gas-tank and thus must be removed each time the motorcycle requires refueling, then reattached for subsequent use. Second, the bag is visible to passers-by while the motorcycle is parked; unless the bag is removed each time, the audio components are vulnerable to theft or vandalism. Lastly, the bag gives the motorcycle a cheap, makeshift appearance. As a result there exists considerable need for a built-in sound system for motorcycles, and for sportsbike-type motorcycles in particular.

Moreover, the prior art has taught that installing a sound system in a motorcycle presents difficulty in assembly, and experience has shown that a system restricted to the limited electrical capabilities of a sportsbike lacks "punch," or output at dynamic highs. In custom-designed automobile-based sound systems, individuals have been known to use capacitors in connection with the vehicle's battery to provide punch. These capacitors are stored in the trunk of the vehicle. However, sound systems in vehicles have been well known for decades. Sound systems in sportsbikes, however, are believed to be not only completely unknown but also contrary to the prevailing practice of minimizing the electrical demand on these types of motorcycles because of the limitations of their electrical power source. Thus, there exists considerable need for a motorcycle sound system that is easily incorporated into the design of the motorcycle and is capable of providing the "punch" desired by listeners.

SUMMARY OF THE INVENTION

According to its major aspects and briefly described, the present invention is a sportsbike with a sound system incorporated into the existing features of the bike so as not to compromise or alter its aerodynamic and stylistic qualities but still deliver effective sound. Most, perhaps all, of the audio components may be incorporated into the cowling behind the rider. Speakers are incorporated into existing structures in front of the driver, such as the rear view mirrors. To provide dynamic audio response—i.e., punch—a capacitor is placed electrically in parallel with the battery of the bike to compensate for the small batter characteristic of sportsbikes and may be incorporated into the rear cowling, the fairing or other existing structure of the sports bike.

An important feature of the present invention in the preferred embodiment is the use of a capacitor in electrical connection with the battery and amplifier to provide audio response during dynamic highs; as a result, the sound does not lack "punch." The capacitor can be incorporated easily into existing structure, such as the cowling behind the rider, without adding undue weight and with no burden on the electrical system of the sportsbike.

Another feature of the present invention is the use of existing structures on a sportsbike to house the components of the sound system. Unlike touring bikes, sportsbikes are designed for speed and agility. The aerodynamic design cannot be compromised by altering it. When integrated into the cowling behind the rider in accordance with the present invention, the present sound system does not alter the outward appearance of the sportsbike and thus cannot be observed by passers-by; the present invention is therefore less vulnerable to theft or vandalism. Nor are the profile and aerodynamics, and therefore performance characteristics, changed by the integration of the sound system with a sportsbike.

Another feature of the present invention is that the components can be packaged in a cowling behind the rider that can then be sold in the aftermarket as an option. The sound system-housing cowling can then be mounted without significant modification of the motorcycle, since the rear cowling used to contain the system preferably has the same profile as commercially available cowlings from the manufacturer of the sportsbike.

Other features and their advantages will be apparent to those skilled in the field of motorcycle sound systems from a careful reading of the Detailed Description of Preferred Embodiments.

BRIEF DESCRIPTION OF THE DRAWINGS

In the drawings,

FIG. 5 is a top view of a sportsbike-type motorcycle 10 equipped with a motorcycle sound system according to a preferred embodiment of the present invention.

DETAILED DESCRIPTION OF PREFERRED EMBODIMENTS

The invention is a sound system that can operate within the structural design and the power requirements of the electrical system of a sportsbike-type motorcycle, rather than touring or cruiser-type motorcycles. Unlike touring or cruiser motorcycles, sportsbikes are aerodynamically designed to be faster and more maneuverable; they are smaller, lighter, sleeker and carry practically no accessories. These characteristics also dictate a more limited electrical-power system than touring motorcycles. It is these limitations on space and electrical power that makes equipping a sportsbike with a full-featured, but integrated, sound system without affecting the external appearance or performance capabilities of the sports bike a challenge.

Normally, the electrical system of a sportsbike is powered by a 12 V battery that is recharged during operation by the sportsbike's alternator. The battery serves to power any electrical devices carried by the sportsbike and is sufficient to provide adequate electrical power for devices that require only a small amount of power. However, the power requirement of a sound system using external speakers and an amplifier is too great for the battery and alternator during instances of peak power demand, also referred to as dynamic highs. Because of the lack of adequate power for the amplifier and speakers during dynamic highs, the resulting sound would lack "punch." Music that lacks "punch" during instances of peak power demand sounds "flat."

The present invention overcomes this inadequacy through the use of a capacitor. A capacitor is a device used to store excess electrical energy. In the most preferred embodiment of the present invention, a capacitor is charged by the battery and, during operation, the alternator. When the sound system's required output exceeds the maximum battery output, the capacitor can provide the additional required electricity during dynamic highs. As a result, the sound does not sound flat or lack "punch."

Figure 1:
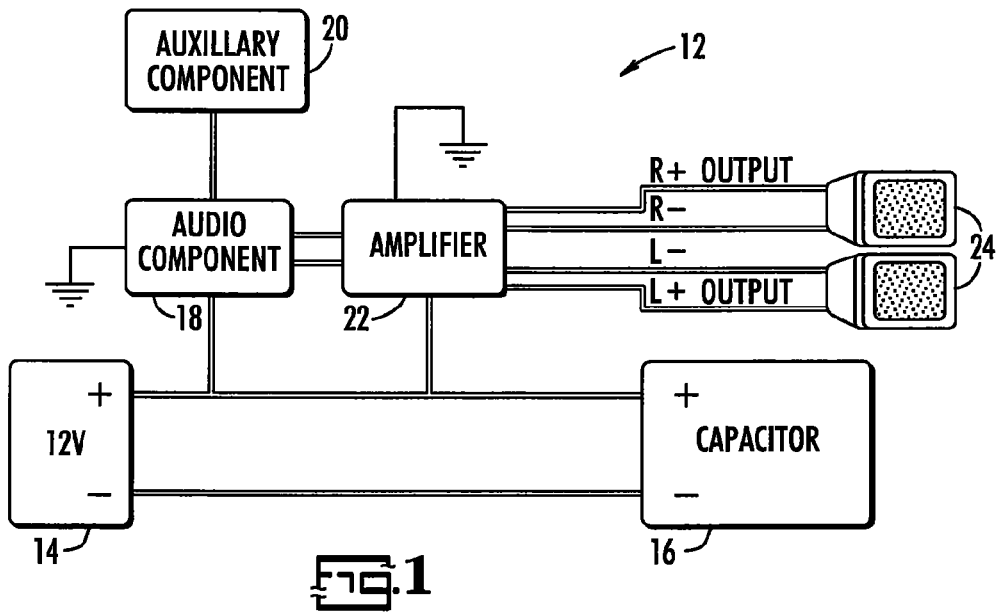
FIG. 1 is a schematic of the system 12 and included components of a motorcycle sound system according to a preferred embodiment of the present invention.

Referring now to FIG. 1, there is shown a schematic of the system components of a motorcycle sound system according to the present invention and generally indicated by reference number 12. System 12 includes a battery 14 in electrical connection with a capacitor 16. Normally, battery 14 is a standard commercially-available 12 V battery for use with motorcycles. The capacitor used in the most preferred embodiment of the present invention is preferably a 1 Farad capacitor, but the present invention is not limited to 1 Farad of capacitance or to a single capacitor. System 12 also includes at least one audio component 18. In a preferred embodiment, audio component 18 is an FM stereo receiver; however, 18 can also be a compact disc player, an audio cassette player, a minidisc player, a digital audiotape player, or an MP3 player. Moreover, the invention is not limited to a single audio component. In addition, audio component 18 can be operably connected to an auxiliary audio component 20. Auxiliary audio component 20 can also be an FM stereo receiver, a compact disc player, an audio cassette player, a minidisc player, a digital audiotape player, or an MP3 player. Alternatively, the auxiliary audio component 20 can be an equalizer. Both audio component 18 and auxiliary audio component 20, if present, are grounded to the frame of sportsbike 10.

Another important feature of the present invention is amplifier 22. Amplifier 22 is operably connected with audio component 18; normally, the means for communicating electrical signals is via audio cable, but this is not limiting. Amplifier 22 is necessary to increase the power of the signal from audio component 18 in order to drive a signal-to-audio transducer, such as speakers 24. As with audio component 18 and auxiliary audio component 20, amplifier 22 is grounded to the frame of motorcycle 10. Speakers 24 are preferably incorporated into existing structures on the motorcycle 10, for example, in the rearview-mirror casings 26, the turn signal casings 28, the brakelight casings 30, the fairings 32, the cowling 34, and the trunk 36. Further, speakers 24 are operably connected to amplifier 22 by a means for communicating signals, normally audio cables, but which could also be infrared light, FM signals, or the like.

Figure 2:
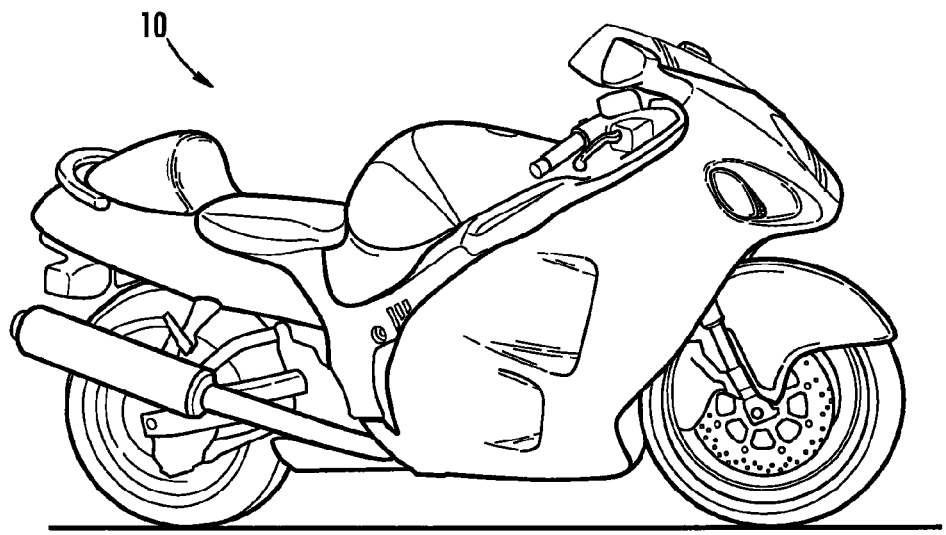
FIG. 2 is a side view of a sportsbike-type motorcycle 10 equipped with a motorcycle sound system according to a preferred embodiment of the present invention.

Referring now to FIG. 2, there is shown a side view of a sportsbike-type motorcycle 10 equipped with motorcycle sound system 12 according to the most preferred embodiment of the present invention. When integrated in sportsbike 10, the system 12 does not alter the appearance of the motorcycle and cannot be observed by passers-by.

Figure 3:
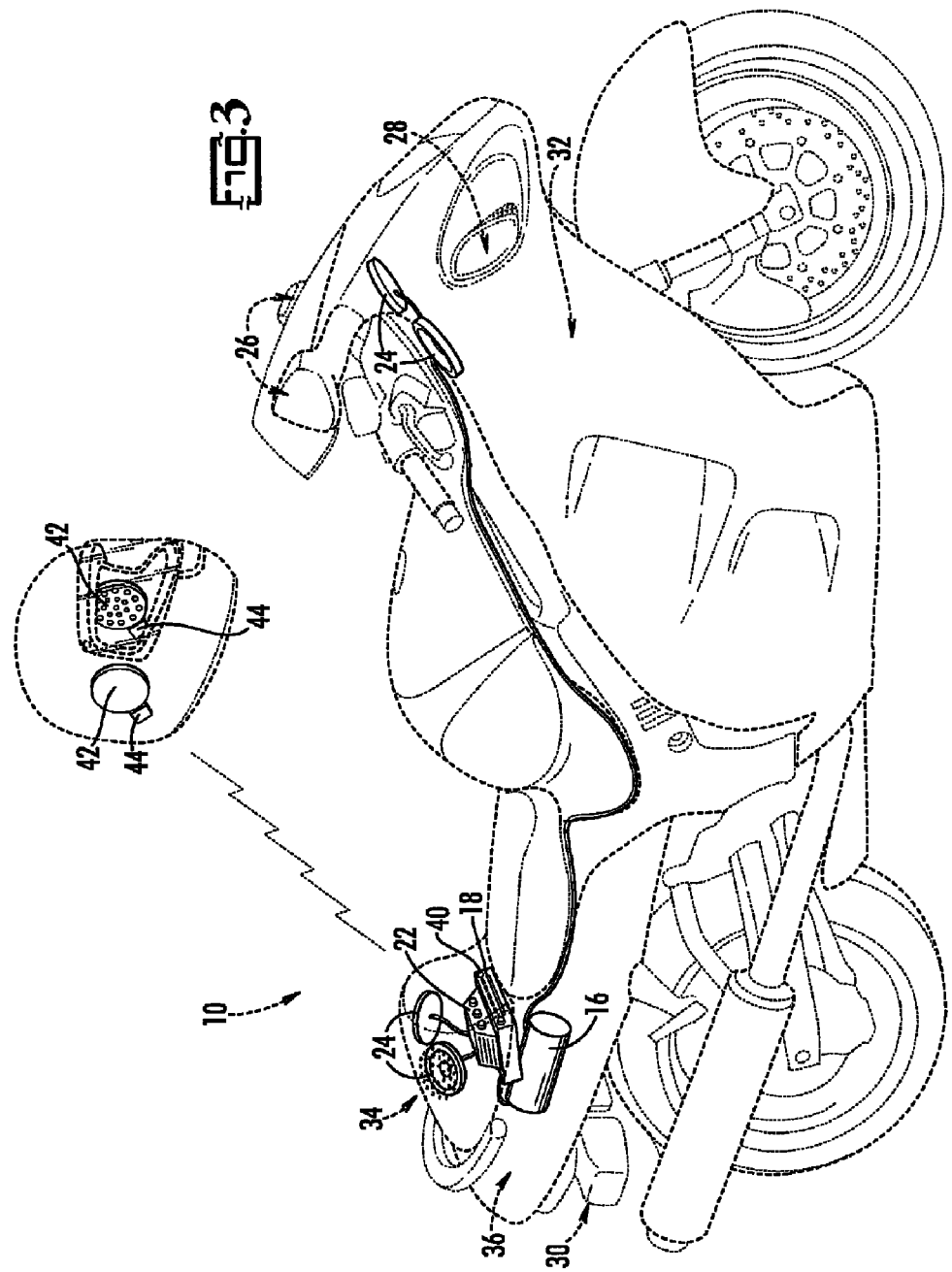
FIG. 3 shows the placement of the various elements of a motorcycle sound system 12 according to a preferred embodiment of the present invention on a sportsbike-type motorcycle.

Referring now to FIG. 3, there is shown the placement of the various elements of a motorcycle sound system 12 according to a preferred embodiment of the present invention on a sportsbike-type motorcycle 10. It is an important feature of the present invention that the profile and appearance, and therefore performance characteristics, are not changed by the integration of system 12 with sportsbike 10. It is also significant that more than one pair of speakers 24 can optionally be used in system 12, as shown in this embodiment of the present invention.

Further, optional elements can be added to sound system 12; these can include, but are not limited to, infrared- or FM-signal remote control unit 38 with remote control signal receiver 40, and helmet-mounted speakers 42 with remote control signal receiver 44.

Figure 4:
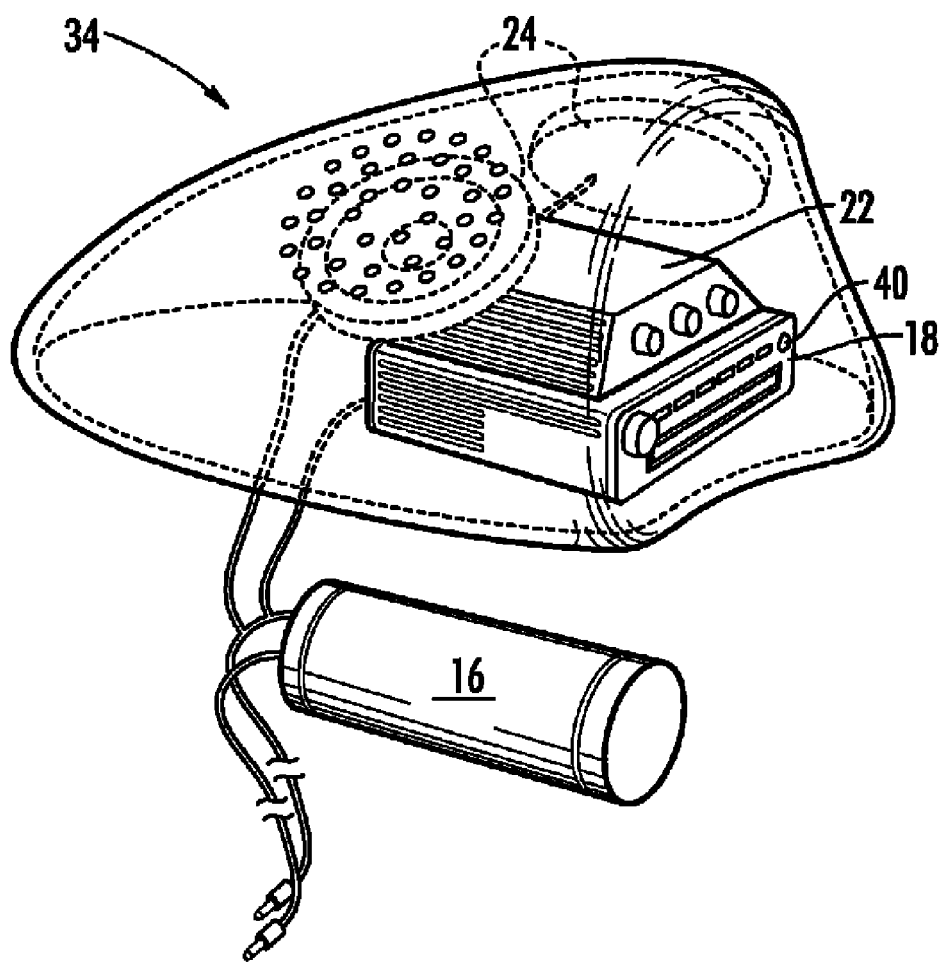
FIG. 4 shows the placement of the various elements of a motorcycle sound system 12 according to a preferred embodiment of the present invention within cowling 34.

Referring now to FIG. 4, there is shown the placement of the various elements of sportsbike sound system 12 inside rear cowling 34, behind the rider, according to a preferred embodiment of the present invention. Cowling 34 is dimensioned so as to be large enough to receive audio component 18, amplifier 22, any auxiliary audio component 20, and, if desired, speakers 24. Capacitor 16 can be included in cowling 34, trunk 36, or mounted beneath trunk 36 and above the rear wheel. It is an important advantage of the present invention that the system 12 as shown in FIG. 4 can be packaged as an aftermarket option for commercially-available sportsbike 10 and attached without significant modification of sportsbike 10, since cowling 34 is preferably selected from commercially available options from the manufacturer of sportsbike 10.

It will be apparent to those knowledgeable in the field of motorcycle sound systems that many modifications and substitutions can be made to the foregoing preferred embodiment without departing from the spirit and scope of the present invention, defined by the appended claims.

LIST OF REFERENCE NUMBERS

| | | |
|---|---|---|
| sportsbike-type motorcycle | 10 | |
| motorcycle sound system, generally | 12 | |
| battery | 14 | |
| capacitor | 16 | |
| audio component | 18 | |
| auxiliary audio component | 20 | |
| amplifier | 22 | |
| speakers | 24 | |
| rearview-mirror casings | 26 | |
| turnsignal casings | 28 | |
| brakelight casings | 30 | |
| fairings | 32 | |
| cowling | 34 | |
| trunk | 36 | |
| remote control unit | 38 | |
| remote control signal receiver | 40 | |
| helmet-mounted speakers | 42 | |
| remote control signal receiver | 44 | |

What is claimed is:

1. A sports bike with a sound system made by a process comprising the steps of:
   (a) providing a sports bike having existing structural features and a battery but no sound system, said existing structural features having an outward appearance to passersby, said structural features include a rear cowling, a fairing, rear view mirror casings, turn signal casings, and brake light casings;
   (b) forming compartments within at least two of said existing structural features wherein said rear cowling being at least one of said existing structural features, said formed compartments being thereby distributed over said sports bike, said compartment in said rear cowling being dimensioned to receive at least one audio component and one other compartment of said at least two formed compartments being dimensioned to receive a set of speakers;
   (c) placing said at least one audio component in said compartment in said rear cowling, and said at least one set of speakers and at least one capacitor being placed within said formed compartments; and
   (d) connecting electrically said at least one audio component, said at least one set of speakers and said at least one capacitor to each other and to said battery to thereby incorporate a sound system within said sports bike, said sports bike with said sound system having the same outward appearance to passersby as said sports bike with no sound system, said at least one audio component, said at least one set of speakers and said at least one capacitor being distributed over said sports bike in said formed compartments of existing structural features of said sports bike, and said capacitor providing supplemental electrical power to said battery during peak power demands of said audio component.

2. The sports bike with a sound system as recited in claim 1, wherein said at least one audio component is selected from the group consisting of FM receiver, compact disc player, audio cassette player, minidisc player, digital audiotape player, MP3 player, and equalizer.

3. The sports bike with a sound system as recited in claim 1, further comprising:
   at least one auxiliary audio component operably connected to said audio component and located within said compartments formed in said existing structural features of said sports bike.

4. The sports bike with a sound system as recited in claim 3, wherein said auxiliary audio component is selected from the group consisting of an FM receiver, a compact disc player, an audio cassette player, a mini disc player, a digital audiotape player, an MP3 player, and an equalizer.

5. The sports bike with a sound system as recited in claim 1, wherein said at least one capacitor is at least 1 Farad.

6. The sports bike as recited in claim 1, with a sound system wherein said existing structural features further comprise a trunk and a helmet.

* * * * *